June 23, 1959   W. A. HUTCHINSON   2,891,273
CASTER

Filed June 27, 1957   3 Sheets-Sheet 1

Inventor:
William H. Hutchinson
By Dudley B. Howard
Attorney

June 23, 1959   W. A. HUTCHINSON   2,891,273
CASTER
Filed June 27, 1957   3 Sheets-Sheet 2
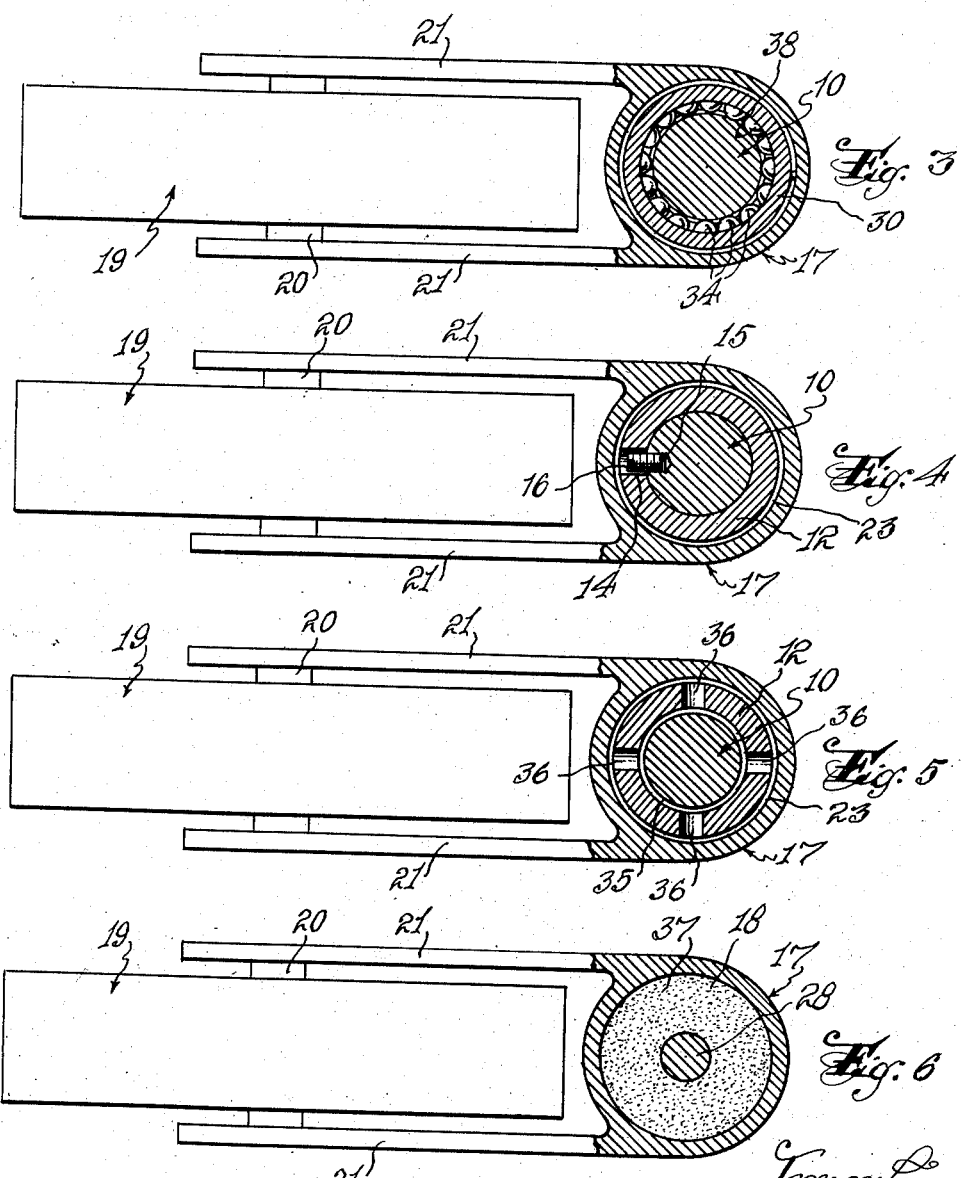
Inventor:
William A. Hutchinson
By Dudley B. Howard
Attorney.

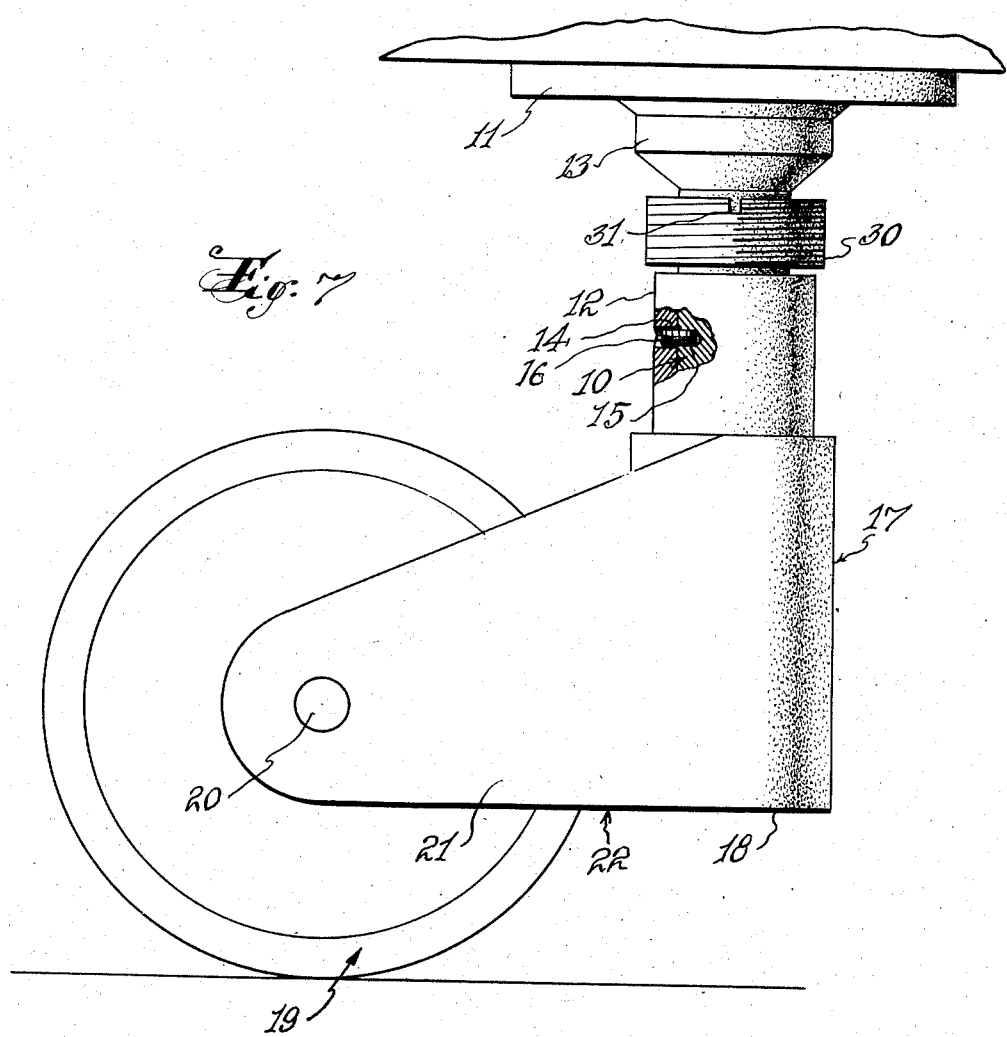

United States Patent Office 2,891,273
Patented June 23, 1959

2,891,273

CASTER

William A. Hutchinson, Irvington, N.J.

Application June 27, 1957, Serial No. 668,558

3 Claims. (Cl. 16—20)

The invention relates to casters used to support various mobile structures such as industrial trucks for warehouses and factories, machines, racks, storage bins, desks, chairs and other articles of furniture, and has particular reference to the swivel mechanism of a sealed type of caster that insures permanent lubrication and no maintenance or adjustment. In this connection it may be explained that by the term "casters" is meant either true casters of trailing type having laterally offset wheels or those swivel devices that are controlled in their swivelling from the outside.

Prior to my present invention, casters that are purported to possess the qualities of infrequent lubrication and little maintenance requirements have been found to be defective in that no means has been provided for continuous and permanent lubrication for both of the upper and lower bearings when more than one are employed at different levels and there is no provision for self-adjustment to accommodate for wear. Moreover, nearly all of these prior art casters involve structural details which are expensive to manufacture due to the machining and other processes required.

With the above-enumerated disadvantages of the prior art caster structures in mind, it is my primary object to provide a swivel mechanism for any duty, heavy or light, that has widely separated upper and lower bearings permitting extra offset of the ground wheel for greater swivelling ease and lowest possible overall height, that includes a large-capacity lubricant reservoir capable of immersing both the upper and the lower bearings in a never-failing bath of lubricant, and that has effective means to seal the reservoir and bearings against any loss of lubricant throughout the useful life of the caster and against ingress of deleterious foreign matter.

Another important object of the invention is to provide a swivel structure that is self-adjusting when wear of the operating parts occurs and thus assures freedom from adjustment maintenance as well as from lubrication maintenance.

Another object of the invention is to provide structural means to achieve the functional advantages possessed by my improved caster which are of great simplicity and capable of being produced by casting and other inexpensive processes.

Still further objects, advantages and features of the invention will become apparent as the following specific description is read in connection with the accompanying drawings, in which:

Fig. 3 is a similar view on line 3—3 of Fig. 1;

Fig. 4 is a similar view on line 4—4 of Fig. 1;

Fig. 5 is a similar view on line 5—5 of Fig. 1;

Fig. 6 is a similar view on line 6—6 of Fig. 1; and

Fig. 7 is a side elevation, partly in section, showing the outer shell partially separated from the inner sleeve during dis-assembly of the unit.

Figure 1:
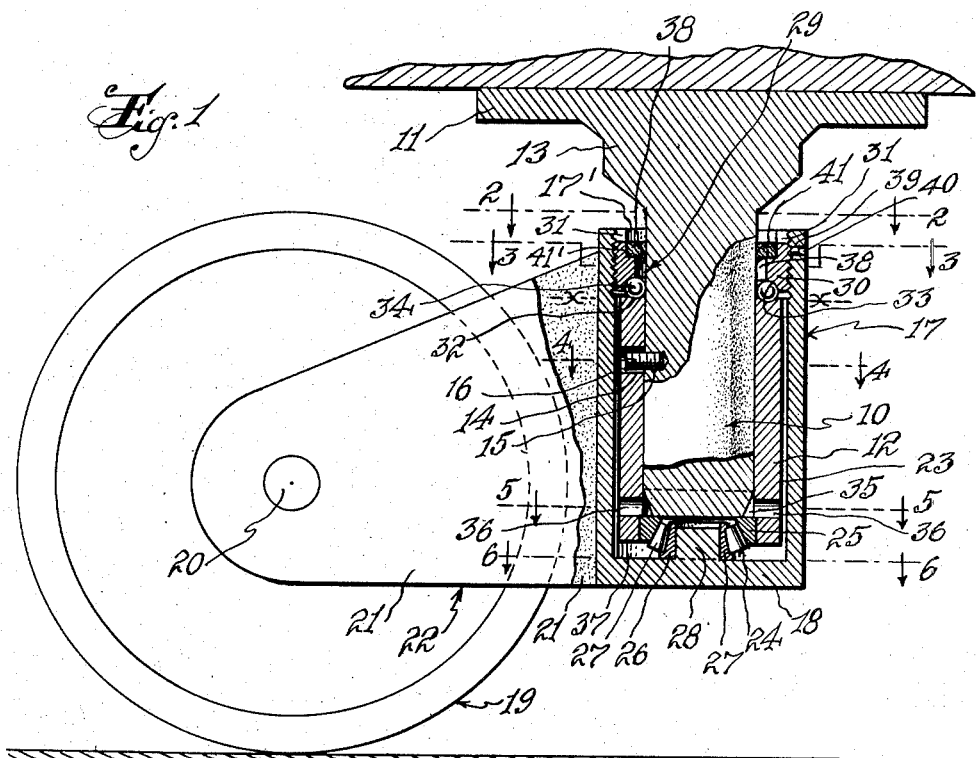
Fig. 1 is a semi-diagrammatic vertical cross-sectional view of the caster unit in assembled condition.
Figure 2:
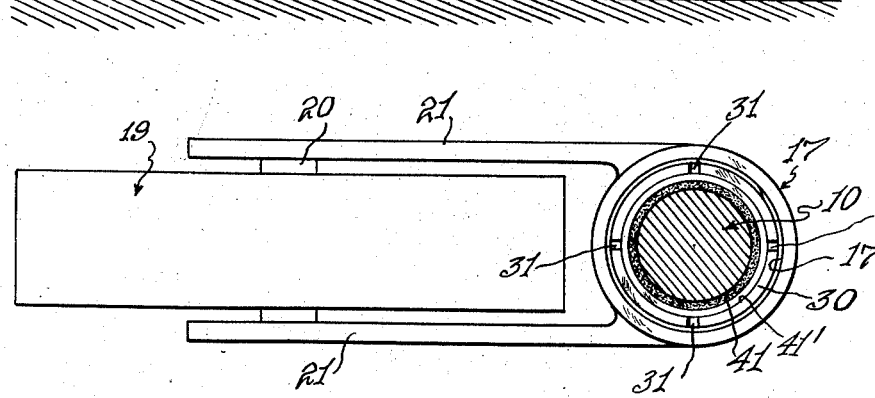
Fig. 2 is a horizontal section on line 2—2 of Fig. 1.

Referring now in detail to the drawings, wherein like reference characters designate corresponding parts in the several views, and in particular to Fig. 1, it will be observed that the improved caster unit utilizes a vertically elongated trunnion 10. This trunnion 10 is circular in cross-section and depends from a top plate 11 that is provided for attachment by any suitable means (not shown) to the underside of a truck or other supported mobile structure. Trunnion 10 preferably is integral with top plate 11, but it is to be understood that it is within the scope of the invention to make these parts separate and attachable one to the other in a rigid condition by welding, bolts, or any other suitable means. Due to the other structural features of the unit, it is practicable to make trunnion 10 of sufficiently large diameter to insure great rigidity and strength in the overall construction, which is particularly desirable in heavy-duty models.

A cylindrical inner sleeve 12 is fitted onto trunnion 10 and, for reasons which will become apparent as the description progresses, preferably extends from a position spaced below the enlarged upper reinforcing portion 13 of said trunnion to a position spaced below the free lower end of the latter. At a suitable location, sleeve 12 is provided with an oversize radial through hole 14 and trunnion 10 has a screwthreaded socket 15 for engagement by a setscrew 16 which may enter through hole 14 when said hole and socket 15 are in radial registration. Setscrew 16 serves as means to secure sleeve 12 on trunnion 10 and to sustain the weight of said sleeve and other parts which are supported thereby in a manner to be described presently. The over-size hole feature is important because it permits self-adjustment of the trunnion bearings when wear occurs, due to the vertical play allowed between trunnion and sleeve.

In the assembled condition of the caster unit, an outer shell 17 encloses inner sleeve 12. This shell 17 is cylindrical in form and has its lower end closed by a bottom wall 18. Except for its open upper end, shell 17 is completely imperforate and fluid-tight in order that it may constitute a vertically extensive reservoir to contain a bath of grease or other lubricant for the bearings of the swivel mechanism.

Outer shell 17 is supported in operational use by ground wheel 19 whose axle 20 is journaled in the side plates 21—21 that are secured rigidly by welding or other means to said shell, whereby parts 21—21—17 are united to form a so-called "swivel horn" 22. It will be observed that, due to the vertical extent of trunnion 10, ground wheel 19 is offset horizontally from the swivel axis to such a degree that extremely low overall height of the caster structure is afforded. Incidentally, the ground wheel supporting assembly 19—20—21 is only semi-diagrammatically represented in the drawings because no novelty is claimed for the details thereof.

In order to provide for an uninterrupted column of lubricant, the inside diameter of shell 17 is slightly greater than the outside diameter of sleeve 12, thereby creating an intervening clearance space 23.

In accordance with the preferred embodiment of the invention, outer shell 17 supports the load imposed by trunnion 10 through the medium of antifriction thrust bearing means 24 located upon bottom wall 18 of said shell, which is especially desirable in heavy-duty applications. As will be explained later herein, it may be entirely practicable in light-duty embodiments of the invention to eliminate antifriction bearing means in the interest of compactness and cost reduction.

It is preferred to adopt for my purposes the standard tapered thrust bearing unit shown in the drawings, which bearing unit includes annular outer and inner concentric races 25 and 26, respectively, and the interposed antifriction rollers 27. Outer race 25 preferably fits with a pressed joint inside the lower end of sleeve 12 and inner race 26 rests upon bottom wall 18 of shell 17. The required axial alignment function at the base of shell 17 and trunnion 10 is performed by a cylindrical central boss 28 that rises from bottom wall 18 of said shell and fits snugly inside the central bore of inner race 26. The vertical length of centering boss 28 should be such that it does not quite reach upward to the lower end of trunnion 10 in order to leave sufficient space for the trunnion to settle down when expansion of the latter or wear in the bearings necessitates such self-adjustment, as permitted by the oversize characteristic of setscrew hole 14 in sleeve 12.

High-level axial alignment of trunnion 10 with outer shell 17 is afforded by upper axial strain bearing means 29, which in the heavy-duty embodiment of the invention is of antifriction type. This bearing means includes an annular externally screwthreaded holding member, or nut, 30 that is removably engaged within the internally screwthreaded counterbore 17' of outer shell 17. The screwthreaded adjustment is not indispensable but permits holding member 30 to be seated readily in its operative relation to the other components of bearing means 29 to be described presently.

Preferably diametrically arranged slots 31—31 are provided in the upper edge of holding member 30 for application of a suitable turning implement, such as a wrench or spanner (not shown).

The upper edge of sleeve 12 may be square-cut or provided, as shown, with an annular raceway 32 for cooperation with an annular raceway 33 that is chamfered in the inner portion of the bottom edge of holding member 30. A set of antifriction balls 34 is mounted in raceways 32—33 to reduce the axial components of friction between trunnion 10 and outer shell 17. These balls 34 also bear against the peripheral face of trunnion 10 in a manner to sustain radial strain even if no grooved raceway were provided in the upper edge of sleeve 12.

As intimated previously herein, it may be entirely practicable particularly in light-duty embodiment of the invention to eliminate antifriction bearings. The thrust bearing means 24, for instance, may consist in direct contact between the lower end face of trunnion 10 and the upper face of bottom wall 18 of shell 17, but some centering means equivalent to boss 28 and bearing means 24 must be provided. In the case of upper radial strain bearing means 29, antifriction balls 34 may be replaced by simplified bearing means in a light-duty embodiment of the invention. Without specific representation in the drawings, the following alternative modifications will be suggested. For example, a metallic ring, preferably of rectangular cross-section, may be substituted for balls 34 in the same location in interposed contact with the lower edge of holding member 30 and the upper edge of sleeve 12. The proposed ring will afford the required radial strain bearing means and also serve to preserve proper alignment of trunnion 10 and outer shell 17. Another arrangement would be to provide an upwardly facing integral shoulder on trunnion 10 well below the top level of the lubricant bath for bearing contact with the lower edge of holding member 30. This shoulder on trunnion 10 would replace sleeve 12. It is to be understood also that it is within the scope of the invention to substitute a tightly fitting non-threaded ring in the counterbore of shell 17 for screwthreaded holding member 30, and to substitute a tightly fitting ring for the proposed shoulder on trunnion 10. These and other alternative bearings means may be adopted as equivalents for the ball bearing unit when constructing a more compact, simplified, light duty embodiment of the invention.

In order to avoid the creation of air pockets and permit lubricant which enters clearance space 23 to penetrate downwardly to thrust bearing means 24, the lower end of trunnion 10 is beveled to form a circumferential passage 35, and plural through holes 36 are provided in the lower portion of sleeve 12 in communication with said passage 35.

To provide a sump 37 for accumulation of any sediment, such as metallic particles that may become suspended in the lubricant bath, well below the bearing surfaces of bearing means 24, sleeve 12 is secured by its frictional fit with bearing race 25 in a position wherein its lower edge is elevated above bottom wall 18 of shell 17.

It is essential that holding member 30 shall be sufficiently thin radially to provide a lubricant space 38 of considerable capacity between said member and trunnion 10 above antifriction balls 34 of bearing means 29 in order to maintain the lubricant level at all times well above the uppermost bearings.

Although holding member 30 has been described heretofore as an element of the top radial strain bearing means 29, it also serves the equally essential purpose of holding the various structural components of the caster together when the lower end of the latter is unsupported, as when wheel 19 becomes elevated above the ground for any reason. It derives its name "holding member" from this function.

Some positive means should be provided to prevent holding member 30 from backing off accidentally, so it is proposed to accomplish this by driving a soft brass or aluminum rivet 39 through a radial hole 40 in shell 17 into binding or locking contact with the external threads of said member 30. This rivet will not deform the threads and may be removed entirely by drilling in the event of dis-assembly.

To complete the assembly of my caster unit, grease sealing means 41, such as a ring of leather, neoprene, or other suitable elastic material, is fitted into a counterbore 41' provided in holding member 30 above lubricant space 38, where it will be in rubbing contact with the peripheral face of trunnion 10.

Just prior to installation of sealing ring 41, the reservoir constituted by shell 17 should have grease or other lubricant admitted to the limit of the storage capacity of its intercommunicating spaces and passages 38—23—36—35—37, so that the level of the lubricant bath will be raised to a point just underneath said sealing ring. In this way, provision will be made for permanent lubrication of both bearing means 24 and 29. Concerning the actual capacity of the lubricant reservoir, it may be mentioned that in a pilot model of the heavy-duty embodiment of my invention, space 38 above line x—x in Fig. 1 contained 10 milliliters of lubricant and the combined spaces and passages below the line contained 60 milliliters.

In assembling the caster unit, the sub-assembly comprising holding member 30 and installed sealing ring 41 is applied to trunnion 10 and held in the elevated position shown in Fig. 7. Then, following introduction of trunnion 10 and attached sleeve 12 into shell 17 to a position in which the inner race 26 of bearing means 24 rests upon bottom wall 18 of said shell, holding member 30 is screwed down into counterbore 17' of the latter and is tightened to the desired degree in its contact with the antifriction balls 34 that have been laid previously on top of sleeve 12 (Fig. 1).

To dis-assemble the unit either partially or completely, holding member 30 with its sealing ring 41 is backed out of shell 17. Fig. 7 shows the parts in a stage of partial dis-assembly. After shell 17 has been lowered sufficiently to unmask setscrew 16, the latter may be backed out to release sleeve 12 at once, in the event it is desired to free trunnion 10 without removing sleeve 12 from within outer shell 17.

It is desired to point out at least three outstanding novel features of my improved caster, which are: (a) bathing of all bearing surfaces with lubricant at all times, the level of the bath being maintained constantly for years of use; (b) elimination of internal maintenance adjustments throughout the life of the caster; and (c) ease of manufacture and assembly due to the simplicity and ruggedness of construction.

To elaborate upon feature (b), it should be emphasized that the load of the truck or other supported structure is sustained entirely by thrust bearing means 24 at the bottom of outer shell 17. Therefore, due to the vertical play allowed between trunnion 10 and sleeve 12 by the provision of an oversize hole 14 for setscrew 16, any shortening or lengthening of said trunnion caused by wear of parts or by thermal expansion and contraction cannot affect the ease and efficiency of operation of the thrust bearing. The lower end of trunnion 10 always will remain seated on outer race 25 of bearing means 24 regardless of any changes in trunnion length, so it may truly be said that the swivel is "self-adjusting." In the similar swivel structures in the prior art of which I am aware, it has been necessary to provide a two-part trunnion with screwthreaded longitudinal adjustment between parts, or to insert shims beneath the trunnion, either of which expedients requires access to the interior of the swivel for maintenance adjustments. That is one thing my invention purposely avoids.

It will be understood that it is intended to cover all changes and modifications of the example of the invention herein chosen for the purpose of illustration which do not constitute departures from the spirit of the invention and scope of the appended claims.

I claim:

1. In a caster swivel unit for a supported mobile structure, an elongated cylindrical trunnion arranged with its axis vertical, means to attach the upper end of said trunnion rigidly in depending relation to the supported structure, a wheel-supported vertical cylindrical outer shell having its upper end open to receive said trunnion for swiveling action and including a side wall and a bottom wall and being imperforate and fluid-tight except at its open upper end to form a vertically elongated lubricant reservoir, axial thrust bearing means supporting the lower end of said trunnion in a centered position on the bottom wall of the outer shell, radial strain bearing means interposed between said trunnion and said outer shell in a position well below the upper end of the latter, said outer shell having sufficient radial clearance from said trunnion to provide a large capacity passage means adapted to hold a continuous lubricant bath extending upward from beneath the axial thrust bearing means to a level well above the radial strain bearing means, fluid sealing means provided at the upper end of said outer shell, the axial thrust bearing means for the trunnion being constituted by a standard tapered bearing including an annular outer race fitted in the lower end of the inner sleeve, an annular inner race resting upon the bottom wall of the outer shell, and antifriction rollers interposed between both races, and a centering boss projecting upwardly from the bottom wall of the outer shell concentric thereto and fitting into the central bore of the inner race to maintain coaxial alignment of the trunnion and outer shell, the upper end of the said boss being spaced vertically from the lower end of the trunnion to permit the latter to settle onto the outer race of the axial thrust bearing means to accommodate for elongation and shortening of said trunnion caused by thermal expansion and contraction and wear.

2. In a caster swivel unit for a supported mobile structure, an elongated cylindrical trunnion arranged with its axis vertical, means to attach the upper end of said trunnion rigidly in depending relation to the supported structure, a wheel-supported vertical cylindrical outer shell having its upper end open to receive said trunnion for swiveling action and including a side wall and a bottom wall and being imperforate and fluid-tight except at its open upper end to form a vertically elongated lubricant reservoir, axial thrust bearing means supporting the lower end of said trunnion in a centered position on the bottom wall of the outer shell, a cylindrical inner sleeve fitted onto the trunnion and being of such length that its upper end is spaced below the upper end of the outer shell, means to secure said sleeve detachably to said trunnion, an annular holding member removably engaged within the upper end portion of the outer shell and arranged to overlie the upper end of the inner sleeve whereby the outer shell and attached caster wheel will be supported in assembled condition by the trunnion through the medium of said inner sleeve and securing means whenever otherwise unsupported, fluid sealing means provided at the upper end of the outer shell, the trunnion being provided with a radial screwthreaded socket and the inner sleeve with a radial through hole adapted to register with said trunnion socket, the means to secure the inner sleeve to the trunnion being a setscrew engaged with said sleeve hole and trunnion socket and secured from disengagement by the adjacent side wall of the outer shell.

3. The invention defined in claim 2, wherein the sleeve hole is oversize in relation to the setscrew diameter to permit vertical play between the inner sleeve and the trunnion and thereby allow the latter to settle upon the axial bearing means in self-adjustment to accommodate for wear and thermal expansion and contraction.

References Cited in the file of this patent

UNITED STATES PATENTS

| | | |
|---|---|---|
| 314,961 | Mendenhall | Mar. 31, 1885 |
| 967,085 | Turner | Aug. 9, 1910 |
| 1,181,631 | Baum | May 2, 1916 |
| 1,487,902 | Trimbach | Mar. 25, 1924 |
| 2,073,066 | Kalberer | Mar. 9, 1937 |
| 2,755,150 | Abbott et al. | July 17, 1956 |

FOREIGN PATENTS

| | | |
|---|---|---|
| 320,240 | Great Britain | Oct. 10, 1929 |